(12) United States Patent
Gardner et al.

(10) Patent No.: US 9,759,624 B2
(45) Date of Patent: Sep. 12, 2017

(54) PRESSURE TRANSDUCER WITH CASE VENT TO AVOID CATASTROPHIC FAILURE

(71) Applicant: KULITE SEMICONDUCTOR PRODUCTS, INC., Leonia, NJ (US)

(72) Inventors: Robert Gardner, Westwood, NJ (US); Lou DeRosa, Wayne, NJ (US); Dick Martin, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 230 days.

(21) Appl. No.: 14/737,539

(22) Filed: Jun. 12, 2015

(65) Prior Publication Data
US 2016/0282211 A1    Sep. 29, 2016

Related U.S. Application Data

(60) Provisional application No. 62/138,936, filed on Mar. 26, 2015.

(51) Int. Cl.
*G01L 19/06* (2006.01)

(52) U.S. Cl.
CPC .................. *G01L 19/0618* (2013.01)

(58) Field of Classification Search
CPC ..... G01L 19/00; G01L 19/06; G01L 19/0618; G01L 19/14
See application file for complete search history.

(56) References Cited

U.S. PATENT DOCUMENTS

| | | | | |
|---|---|---|---|---|
| 3,938,393 A | * | 2/1976 | Mogensen | G01L 19/0672 374/E1.011 |
| 2006/0225493 A1 | * | 10/2006 | Dannhauer | G01L 19/0618 73/146 |
| 2007/0107525 A1 | * | 5/2007 | Schnaare | G01L 19/0618 73/756 |
| 2014/0102354 A1 | * | 4/2014 | Mayr | G01L 19/0618 116/212 |
| 2015/0078920 A1 | * | 3/2015 | Chou | F04B 41/02 417/63 |
| 2016/0153858 A1 | * | 6/2016 | Strott | G01L 9/0042 73/727 |

FOREIGN PATENT DOCUMENTS

GB         1489340 A  * 10/1977  ............... G01K 1/08

* cited by examiner

*Primary Examiner* — Nguyen Ha
*Assistant Examiner* — Wyn Ha
(74) *Attorney, Agent, or Firm* — Troutman Sanders LLP; James E. Schutz; Mark Lehi Jones

(57) ABSTRACT

Certain implementations of the disclosed technology may include systems, methods, and sealed transducer assembly with a pressure relief vent. In certain implementations, a transducer assembly is provided having a vent bore and a rupturable membrane sealing the vent bore. The vent bore may extend from an internal portion of the transducer assembly to an external portion of the transducer assembly. The rupturable membrane is configured to maintain a seal within the internal portion of the transducer assembly for a first range of a pressure differential between the internal portion of the transducer assembly and the external portion of the transducer assembly, and rupture and vent pressure through the vent bore when the pressure differential exceeds the first range.

20 Claims, 3 Drawing Sheets

PRESSURE TRANSDUCER WITH CASE VENT TO AVOID CATASTROPHIC FAILURE

RELATED APPLICATIONS

This application claims priority under 35 U.S.C. 119 to U.S. Provisional Patent Application No. 62/138,936, entitled "Pressure Transducer With Case Vent To Avoid Catastrophic Failure," filed 26 Mar. 2015, the contents of which are incorporated by reference in their entirety as if fully set forth herein.

FIELD

The disclosed technology relates to transducers, and more particularly to pressure transducers with an emergency pressure relief vent.

BACKGROUND

Transducers can be utilized in numerous applications to measure a broad range of environmental conditions. Pressure transducers are often used in machines, for example, to monitor various pressures associated with the machine, and to provide control signals for safe and efficient operation of the machine.

In a standard pressure transducer, if there is an internal leak such as through a header weld, the pressure media being measured can leak into the case and build-up pressure. If the pressure being measured is high enough, the case may not be able to contain such pressure and the case may burst. Often such a rupture is catastrophic and can cause additional damage to components around the transducer. This can also happen even with very small leaks over time. A similar situation can happen if the external temperature of the transducer gets too high causing the internal components to ignite and build up pressure, for example, due to exhaust gases.

A need exists for a sealed transducer assembly in which pressure can be relieved.

BRIEF SUMMARY

Systems, methods, and apparatus are presented herein in accordance with certain example implementations of the disclosed technology for providing a sealed transducer with a vent for relieving internal pressure.

In certain implementations, a transducer assembly is provided having a vent bore and a rupturable membrane sealing the vent bore and an internal portion of the transducer assembly. In an example implementation, the vent bore may extend from an internal portion of the transducer assembly to an external portion of the transducer assembly. In an example implementation, the rupturable membrane may be configured to seal the vent bore. In accordance with an example implementation of the disclosed technology, the rupturable membrane may be configured to maintain a seal within the internal portion of the transducer assembly, for a first range of a pressure differential between the internal portion of the transducer assembly and the external portion of the transducer assembly. The rupturable membrane may be configured to rupture and vent pressure through the vent bore when the pressure differential exceeds the first range.

Certain example implementations include a method. The method may include configuring a pressure transducer assembly with at least one vent bore, the vent bore extending from an internal portion of the pressure transducer assembly to an external portion of the pressure transducer assembly. The method may include covering the vent bore with a rupturable membrane and sealing an interface between the rupturable membrane and the vent bore. The rupturable membrane may be configured to maintain a seal within the internal portion of the transducer assembly for a first range of a pressure differential between the internal portion of the transducer assembly and the external portion of the transducer assembly, and rupture and vent pressure through the vent bore when the pressure differential exceeds the first range.

Other implementations, features, and aspects of the disclosed technology are described in detail herein and are considered a part of the claimed disclosed technology. Other implementations, features, and aspects of the disclosed technology can be understood with reference to the following detailed description, accompanying drawings, and claims.

BRIEF DESCRIPTION OF THE FIGURES

The disclosed technology is illustrated by way of examples and certain disclosed implementations. This disclosure includes accompanying figure, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and to explain various principles and advantages, in accordance with the present disclosure.

DETAILED DESCRIPTION

The disclosed technology relates to sealed transducers having a built-in vent that can rupture to vent and relieve pressure.

Some implementations of the disclosed technology will be described more fully hereinafter with reference to the accompanying drawing. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner. Various implementations will now be described with reference to the accompanying figures.

Figure 1:
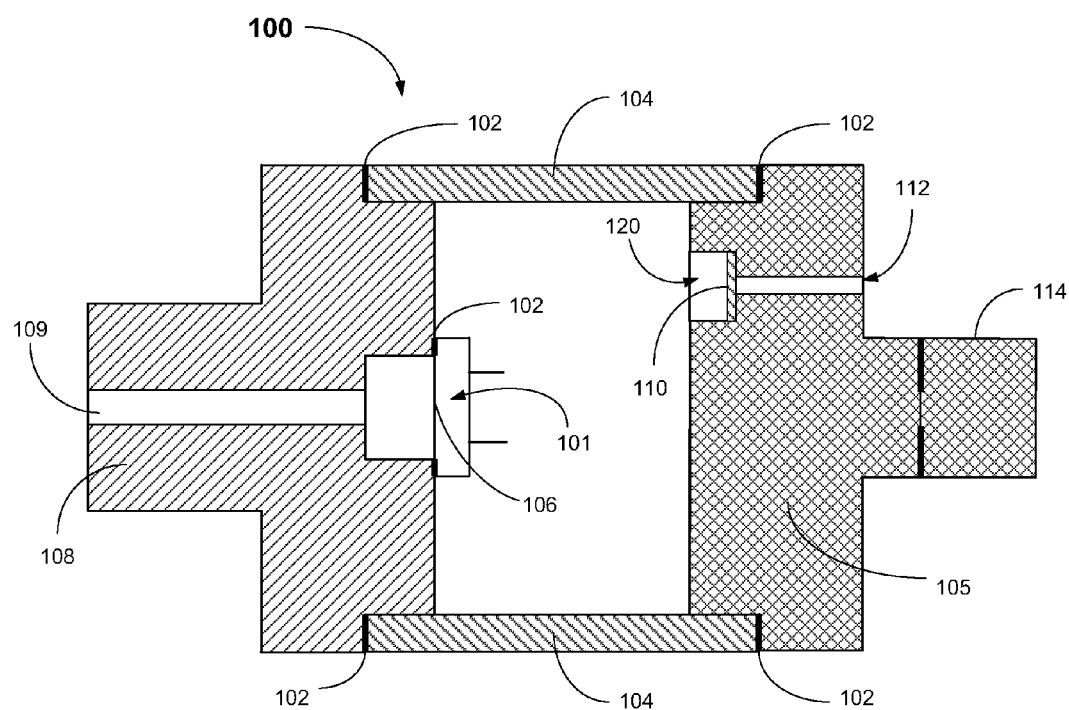
FIG. 1 illustrates a pressure transducer assembly, according to an example implementation of the disclosed technology.

As depicted in FIG. 1, an example implementation of the disclosed technology includes a transducer assembly 100 with at least one pressure-relief port covered by a membrane (or other suitable material such as a diaphragm) that can rupture to relieve internal pressure through the port when the internal pressure exceeds a certain level. Certain example implementations may be configured with a hermetic case to maintain a seal under certain normal internal pressures, but to vent the internal pressure before the internal pressure builds up to a certain level. For example, the pressure-relief port may vent before the internal pressure is able to deform other parts of the assembly 100 or damage surrounding components.

According to an example implementation of the disclosed technology, the transducer assembly 100 may include a transducer 101, which may be attached to a transducer header portion 108, to maintain a seal, for example, by a glass-to-metal seal 106. The transducer 101 may be in communication with a pressure port bore 109, for example, to measure pressure in a desired measurement environment. The measurement environment may include media such as fluids, gasses, air, etc. In certain example implementations, the header portion 108 may provide a mount to secure the transducer assembly 100 to the measurement environment, for example, through a hole in a casing. In an example implementation, one or more welds 102 may secure a portion of the transducer 101 to a portion of the transducer header portion 108.

In an example implementation, the transducer assembly 100 may include a case back portion 105 and a sleeve 104. In certain example implementations, the sleeve 104 may be connected to the header portion 108, for example, by one or more welds 102.

In accordance with an example implementation of the disclosed technology, a small diameter vent bore 112 may be configured in the case back portion 105. In an example implementation, a membrane 110 may cover and seal the vent bore 112 to maintain a hermetic seal under normal operation. According to an example implementation of the disclosed technology, the membrane 110 may be configured to rupture when an internal of pressure transducer assembly 100 exceeds a certain level to allow the pressure to escape through the vent bore 112. In certain example implementations, the membrane 110 may be a thin metal diaphragm. In other example implementations, certain other materials such as glass, silicon, metal, alloys, etc., may be utilized for the membrane 110.

In certain example implementations, the thickness and diameter of the membrane 110 can be adjusted to change the rupture pressure of the membrane 110 depending on how much differential pressure between an inner portion and outer portion of the assembly 100 the other components of the transducer assembly 100 case can safely maintain without rupture, and so that the transducer assembly 100 may be vented safely.

In certain example implementations, once the membrane 110 is installed and sealed to cover the vent bore 112, the sleeve 104 may be connected to the case back portion 105 by one or more welds 102. In certain example implementations, the case back portion 105 may be configured for attaching to a connector port 114. For example, the connector port 114 may provide power and/or various signals to/from the transducer 101.

In accordance with an example implementation of the disclosed technology, the pressure transducer assembly 100 may include an internal portion that may be defined by the various seals 106, welds 102, sleeves 104, headers 108, case back portions 105, and/or membranes 110. These components may also provide a hermetic seal for the internal portion, for example, to keep measurement media from entering the internal portion of the pressure transducer assembly.

In certain implementations, a material such as room temperature vulcanization (RTV) silicon, or other suitable materials may be injected into the internal portion of the pressure transducer assembly 100, for example to keep fluids or other materials from entering the internal portion of pressure transducer assembly 100. In certain example implementations, the RTV (or similar material) may be used to protect any internal sensors or electronics, for example, in the event of an over-pressure event in which the membrane is ruptured.

In accordance with an example implementation of the disclosed technology, the internal pressure that may cause the membrane 110 to burst may be larger when exerted from the inside portion of the assembly 100 than it would be from the outside portion because of the difference in effective diameters experiencing the pressure. For example, for pressures building up from the inner portion of the pressure transducer assembly 110, the "effective diameter" of the membrane 110 may be that of the diameter of the vent bore 112, while the "effective diameter" for pressures building up from the outside may be the entire diameter of the membrane 110, particularly if the membrane 110 is sealed to the back portion 105 at the circumference of the membrane 110.

In one example implementation, a cable assembly may communicate through a portion of the body of the assembly 100. For example, a rear header may be used to maintain a hermetic seal with the cable assembly. Thus, in certain example implementations, the vent bore 112 and membrane 110 design may also be used in a rear header.

The disclosed technology provides an advantage over a simple check valve in that the transducer may be sealed until the membrane 110 is ruptured or broken. In certain example implementations, the membrane may provide a hermetic seal for an internal portion of the transducer assembly 100. Other advantages of the disclosed technology may provide a smaller package compared with other designs. Still other advantages of the disclosed technology may enable a simple implementation for protecting equipment against catastrophic failure.

In accordance with an example implementation of the disclosed technology, and as shown in FIG. 1, the membrane 110 may be seated and sealed in communication with the vent bore 112 via a seal bore 120 that has a diameter and/or shape that may differ from the diameter and/or shape of the vent bore 112. In other example implementations, the vent bore 112 and seal bore 120 may be of substantially equal diameter and/or shape. For example, FIG. 1 depicts a seal bore 120 that has a larger diameter than the vent bore 112. Also, as depicted in FIG. 1, the membrane 110 may be placed at an interface between the vent bore 112 and the seal bore 120. Yet in other example implementations, the membrane 110 may be disposed at one end or another of the seal bore 120, as will be discussed below with reference to FIG. 2 and FIG. 3.

Figure 2:
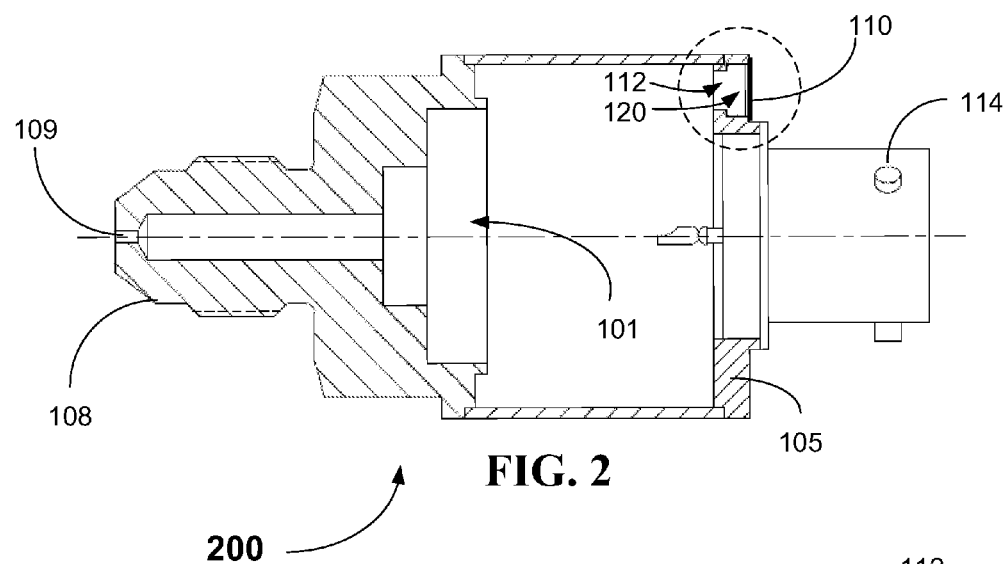
FIG. 2 illustrates a pressure transducer assembly, having a rupturable membrane configured near an external portion of the transducer assembly, according to an example implementation of the disclosed technology.

FIG. 2 depicts an example implementation of a transducer assembly 200 having similar elements (101-120) as described with respect to the transducer assembly 100 of FIG. 1. However, in this example implementation, the membrane 110 may be welded or sealed to the outer portion of the case back portion 105, thus reversed or creating an alternate support structure. Such an implementation may be advantageous in situations where the outside pressure may be quite high, such as for sub-sea applications.

As highlighted by the dashed circular region in FIG. 2, and as previously discussed, the membrane 110 may be in communication with the vent bore 112. In certain example implementations, the membrane 110 may be in communication with the vent bore 112 via a seal bore 120 (as shown) that has a diameter and/or shape that differs from the diameter and/or shape of the vent bore 112. Also, as depicted in FIG. 2, the transducer assembly 200 may include a connector port 114 for attaching the transducer assembly 200 to a connector/cable, for example, to provide power to sensing electronics within the transducer assembly 200 and to output measured pressure signals.

Figure 3:
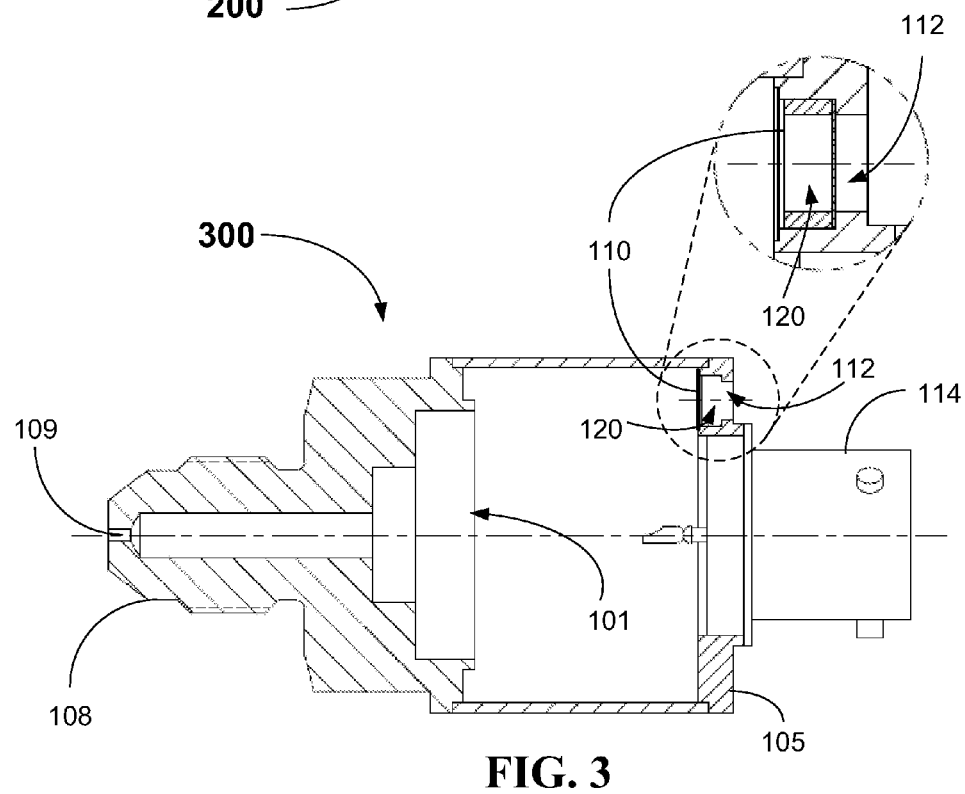
FIG. 3 illustrates a pressure transducer assembly, having a rupturable membrane configured near an internal portion of the transducer assembly, according to an example implementation of the disclosed technology.

FIG. 3 depicts an example implementation of a transducer assembly 300 having similar elements (101-120) as described with respect to the transducer assemblies 100 200 of FIG. 1 and FIG. 2. In this example implementation, the membrane 110 may be welded and/or sealed to the inner portion of the case back portion 105. As depicted in FIG. 3, and according to an example implementation, the membrane 110 may be attached flush to the internal portion case back portion 105. As shown and as previously discussed, the membrane 110 may be in communication with the vent bore 112 via a seal bore 120 that has a diameter and/or shape that differs from the diameter and/or shape of the vent bore 112. In certain example implementations, the vent bore 112 and seal bore 120 may have substantially the same shape and/or diameter.

In accordance with certain example implementations, the interface in which the membrane 110 may be welded or sealed to the inner (or outer) portion the case back portion 105 (or other portions of the transducer assembly) may include a recess portion in which the membrane 110 may be seated, for example, to help improve the reliability of the weld. In certain example implementations, the recess portion may help aid in positioning the membrane 110 against the back portion 105, vent bore 112 and/or seal bore 120 for the welding or sealing process.

Figure 4:
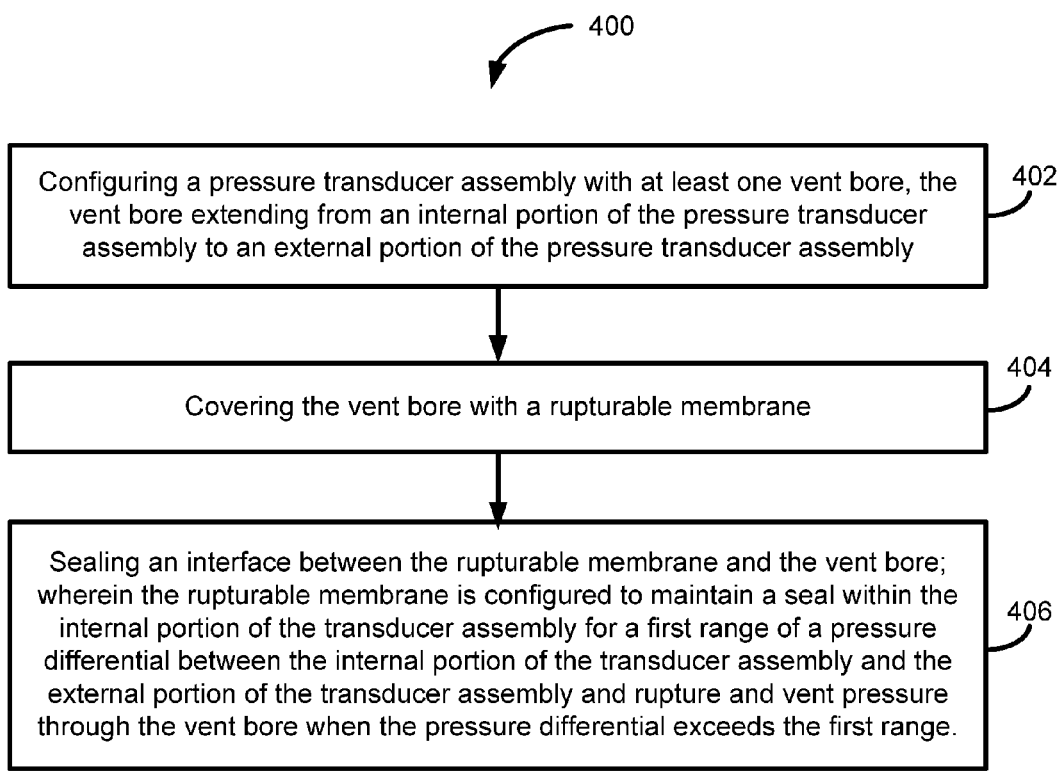
FIG. 4 is a method according to an example implementation of the disclosed technology.

FIG. 4 is a flow-diagram of a method 400, according to an example implementation of the disclosed technology. In block 402, the method 400 includes configuring a pressure transducer assembly with at least one vent bore, the vent bore extending from an internal portion of the pressure transducer assembly to an external portion of the pressure transducer assembly. In block 404, the method 400 includes covering the vent bore with a rupturable membrane. In block 406, the method 400 includes sealing an interface between the rupturable membrane and the vent bore.

In accordance with an example implementation of the disclosed technology, the rupturable membrane 110 may be configured to maintain a seal within the internal portion of the transducer assembly for a first range of a pressure differential between the internal portion of the transducer assembly and the external portion of the transducer assembly, and rupture and vent pressure through the vent bore when the pressure differential exceeds the first range.

In certain example implementations, the rupturable membrane 110 may be configured to maintain a hermetic seal within the internal portion of the transducer assembly.

In certain example implementations, the rupturable membrane 110 may be disposed towards the external portion of the transducer assembly and is in communication with an internal portion of the vent bore 112.

In certain example implementations, the rupturable membrane 110 may be disposed towards the internal portion of the transducer assembly and is in communication with an external portion of the vent bore 112.

Certain example implementations of the disclosed technology may include configuring a header portion comprising a pressure port bore. Certain example implementations of the disclosed technology may include configuring a transducer in communication with the pressure port bore. Certain example implementations of the disclosed technology may include configuring a back portion configured for attaching to a connector. Certain example implementations of the disclosed technology may include configuring a sleeve portion in communication with the header portion and the back portion.

In certain example implementations, the transducer may be attached to the header portion. In certain example implementations, the transducer may be attached to the header portion by a glass-to-metal seal. In certain example implementations, the sleeve portion may be attached to the header portion and the back portion with one or more welds. In certain example implementations, the rupturable membrane may include a metal diaphragm. In certain example implementations, the rupturable membrane may include one or more of glass, silicon, metal, metal alloy, and/or other alloys.

In accordance with an example implementation of the disclosed technology, the rupturable membrane may be configured to rupture and vent pressure through the vent bore when the pressure differential exceeds the first range and when the pressure differential is less than a failure point of the transducer assembly housing.

In one example implementation of the disclosed technology, the rupturable membrane 110 may be made from stainless steel. In another example implementation, the rupturable membrane 110 may be made from an alloy. In certain example implementations, the rupturable membrane 110 may be made from an austenite nickel-chromium-based superalloy, such as Inconel. Other suitable material may be utilized for the rupturable membrane 110 without departing from the scope of the disclosed technology.

In accordance with certain example implementations of the disclosed technology, the rupturable membrane 110 may range in diameter from about 0.06" to about 0.25", as may be dictated by the application and/or anticipated pressure differentials.

In accordance with certain example implementations of the disclosed technology, the rupturable membrane 110 may range in thickness from about 0.0005" to about 0.005", as may be dictated by the application and/or anticipated pressure differentials.

In accordance with certain example implementations of the disclosed technology, the rupturable membrane 110, alone or in combination with the vent bore 112 configuration, may be configured to maintain a seal for pressure differentials between the internal and external portion of the transducer assembly (100 200 300) ranging between about 100 psi to about 800 psi, as may be dictated by the application and/or anticipated pressure differentials, which in certain implementations, may be a pressure differential range below the failure point of the transducer assembly housing.

In accordance with certain example implementations of the disclosed technology, the vent bore 112 and/or the seal bore 120 may range in diameter from about 0.05" to about 0.125", as may be dictated by the application and/or anticipated pressure differentials.

In accordance with certain example implementations of the disclosed technology, the vent bore 112 and/or the seal bore 120 may range in length of about 0.1" to about 0.25" deep, as may be dictated by the application and/or anticipated pressure differentials.

In accordance with certain example implementations of the disclosed technology, vent bore 112 and/or the seal bore 120 may be configured in other elements of the transducer assembly (100 200 300) besides the case back portion 105. For example, in one example implementation, the vent bore 112 and/or the vent bore 112 seal bore 120 may be configured in the sleeve 104, as may be dictated by the application, anticipated pressure differentials, and/or wall thickness in which the vent bore 112 is configured.

In accordance with an example implementation of the disclosed technology, various combinations of thickness and/or diameters and/or shapes one or more of the rupturable membrane 110, vent bore 112, and/or seal bore 120 may be configured to withstand pressure differentials between an internal and external portion of the transducer assembly (100 200 300) for pressure differentials at or above a particular pressure differential range (such as up to the maximum pressure of the pressure sensor element or transducer) but to rupture at a pressure differential that is lower than the failure pressure differential of the transducer assembly (100 200 300) housing.

According to certain example implementations, the vent bore 112 may be curved. According to certain example implementations, the vent bore 112 may be tapered. In yet other example implementations, the vent bore 112 may transition from one geometry at an internal portion to another geometry at an external portion of the transducer assembly (100 200 300). For example, in one implementation, the vent bore 112 may be circular in shape where it is closest to the membrane 110, but square in shape at the other end of the vent bore 112.

In accordance with an example implementation of the disclosed technology, the rupturable membrane 110 may have a uniform thickness. In yet other example implementations, the rupturable membrane 110 may have a non-uniform thickness. For example, a certain portion of the rupturable membrane 110 (such as a central portion) may be precisely machined for a given rupture pressure differential. In this implementation, a batch of membrane or diaphragm pre-forms or slugs may be manufactured to a first tolerance, then customized to a second tolerance.

While certain implementations of the disclosed technology have been described in connection with what is presently considered to be the most practical implementations, it is to be understood that the disclosed technology is not to be limited to the disclosed implementations. Rather, the disclosed technology is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology, is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A transducer assembly comprising:
   a vent bore extending from an internal portion of the transducer assembly to an external portion of the transducer assembly; and
   a rupturable membrane configured to seal the vent bore, wherein the rupturable membrane is configured to:
   maintain a seal within the internal portion of the transducer assembly for a first range of a pressure differential between the internal portion of the transducer assembly and the external portion of the transducer assembly; and
   rupture and vent pressure through the vent bore when the pressure differential exceeds the first range.

2. The transducer assembly of claim 1, wherein the rupturable membrane is configured to maintain a hermetic seal within the internal portion of the transducer assembly during the first range of the pressure differential.

3. The transducer assembly of claim 1, wherein the rupturable membrane is disposed proximate the external portion of the transducer assembly and is in communication with an internal portion of the vent bore.

4. The transducer assembly of claim 1, wherein the rupturable membrane is disposed proximate the internal portion of the transducer assembly and is in communication with an external portion of the vent bore.

5. The transducer assembly of claim 1, further comprising:
   a header portion comprising a pressure port bore;
   a transducer in communication with the pressure port bore;
   a back portion configured for attaching to a connector; and
   a sleeve portion in communication with the header portion and the back portion.

6. The transducer assembly of claim 5, wherein the transducer is attached to the header portion.

7. The transducer assembly of claim 6, wherein the transducer is attached to the header portion by a glass-to-metal seal.

8. The transducer assembly of claim 5, wherein the sleeve portion is attached to the header portion and the back portion with one or more welds.

9. The transducer assembly of claim 1, wherein the rupturable membrane is configured to rupture and vent pressure through the vent bore when the pressure differential exceeds the first range and when the pressure differential is less than a failure point of the transducer assembly housing.

10. The transducer assembly of claim 1, wherein the rupturable membrane comprises one or more of glass, silicon, metal, and metal alloy.

11. A method comprising:
configuring a pressure transducer assembly with at least one vent bore, the vent bore extending from an internal portion of the pressure transducer assembly to an external portion of the pressure transducer assembly;
covering the vent bore with a rupturable membrane; and
sealing an interface between the rupturable membrane and the vent bore;
wherein the rupturable membrane is configured to:
maintain a seal within the internal portion of the transducer assembly for a first range of a pressure differential between the internal portion of the transducer assembly and the external portion of the transducer assembly; and
rupture and vent pressure through the vent bore when the pressure differential exceeds the first range.

12. The method of claim 11, wherein the rupturable membrane is configured to maintain a hermetic seal within the internal portion of the transducer assembly.

13. The method of claim 11, wherein the rupturable membrane is disposed towards the external portion of the transducer assembly and is in communication with an internal portion of the vent bore.

14. The method of claim 11, wherein the rupturable membrane is disposed towards the internal portion of the transducer assembly and is in communication with an external portion of the vent bore.

15. The method of claim 11, further comprising configuring:
a header portion comprising a pressure port bore;
a transducer in communication with the pressure port bore;
a back portion configured for attaching to a connector; and
a sleeve portion in communication with the header portion and the back portion.

16. The method of claim 15, wherein the transducer is attached to the header portion.

17. The method of claim 16, wherein the transducer is attached to the header portion by a glass-to-metal seal.

18. The method of claim 15, wherein the sleeve portion is attached to the header portion and the back portion with one or more welds.

19. The method of claim 11, wherein the rupturable membrane is configured to rupture and vent pressure through the vent bore when the pressure differential exceeds the first range and when the pressure differential is less than a failure point of the transducer assembly housing.

20. The method of claim 11, wherein the rupturable membrane comprises one or more of glass, silicon, metal, and metal alloy.

* * * * *